(12) United States Patent
Kino et al.

(10) Patent No.: US 8,561,825 B1
(45) Date of Patent: Oct. 22, 2013

(54) DUAL WALL TUMBLER

(75) Inventors: Yukio Kino, Osaka (JP); Hiroshi Taketani, Osaka (JP)

(73) Assignee: Takeya USA Corporation, Huntington Beach, CA (US)

( * ) Notice: Subject to any disclaimer, the term of this patent is extended or adjusted under 35 U.S.C. 154(b) by 0 days.

(21) Appl. No.: 13/473,497

(22) Filed: May 16, 2012

(51) Int. Cl.
| | | |
|---|---|---|
| *B65D 21/02* | (2006.01) | |
| *A47J 39/00* | (2006.01) | |
| *A47J 41/00* | (2006.01) | |

(52) U.S. Cl.
USPC ............... 220/23.89; 220/592.16; 215/13.1

(58) Field of Classification Search
USPC ............ 220/23.89, 592.16, 592.17, 592.2, 220/592.23–592.28, 23.87, 215, 288, 220/700–703, 378, 319, 318, 574, 574.2, 220/574.3, 560, 23.91, 780, 795, 62.12, 220/648, 711, 727; 215/13.1, 12.1, 384
See application file for complete search history.

(56) References Cited

U.S. PATENT DOCUMENTS

| | | | | |
|---|---|---|---|---|
| 3,766,975 A | * | 10/1973 | Todd | 165/74 |
| 4,489,840 A | * | 12/1984 | De Freitas | 215/13.1 |
| 5,558,240 A | * | 9/1996 | Karp | 215/398 |
| 5,634,567 A | * | 6/1997 | Hekal | 220/359.3 |
| 6,050,443 A | * | 4/2000 | Tung | 220/592.17 |
| 7,073,678 B1 | * | 7/2006 | Dibdin et al. | 220/254.1 |
| 7,556,172 B2 | * | 7/2009 | Lane | 220/714 |
| 7,669,725 B2 | * | 3/2010 | Randolph et al. | 215/12.1 |
| 8,225,957 B1 | * | 7/2012 | Volan | 220/592.23 |
| 2003/0029876 A1 | * | 2/2003 | Giraud | 220/592.17 |
| 2008/0006643 A1 | * | 1/2008 | Ma | 220/592.16 |
| 2008/0290093 A1 | * | 11/2008 | Vadersen | 220/359.2 |
| 2012/0223071 A1 | * | 9/2012 | Hsiung | 220/4.01 |

* cited by examiner

*Primary Examiner* — Bryon Gehman
*Assistant Examiner* — Shawn Braden
(74) *Attorney, Agent, or Firm* — Knobbe Martens Olson & Bear LLP

(57) ABSTRACT

A drinking vessel includes a first receptacle having a first circumferential side wall extending from a closed bottom end to a shoulder having a peripheral edge defining a first diameter. An externally-threaded attachment portion, defining a second diameter smaller than the first diameter, extends from the shoulder to a circumferential lip. A second receptacle configured to fit inside the first receptacle has a second circumferential side wall extending from a closed bottom end to an upper rim defining an open top end. A circumferential flange, depending downwardly from the rim and fitting coaxially around the attachment portion, has a lower end separated from the shoulder by a circumferential gap. The flange has an outer surface and an internally-threaded portion that mates with the attachment portion. A resilient element has a grip portion fixed to the outer surface of the flange and a sealing portion configured to seal the gap.

12 Claims, 3 Drawing Sheets

DUAL WALL TUMBLER

CROSS-REFERENCE TO RELATED APPLICATION

Not applicable.

FEDERALLY SPONSORED RESEARCH OR DEVELOPMENT

Not applicable.

BACKGROUND

This disclosure relates to the field of drinking vessels and the like, particularly drinking vessels or "tumblers" that are made of a hard plastic material and that have a dual wall construction for thermal insulation.

Conventional dual wall plastic drinking vessels or tumblers comprise an inner receptacle defined by a first circumferential wall, and an outer receptacle defined by a second circumferential wall. The first and second walls are separated by an air-filled space, and they are joined to each other at a peripheral rim or lip defining the open top of the tumbler. The juncture of the inner and outer walls at the peripheral rim is typically accomplished by a sonic welding process, or alternatively, by a suitable adhesive. It is important that the juncture provide a fluid-tight seal to prevent liquid from leaking into the space between the two walls. Obtaining a seal with good integrity by sonic welding or by an adhesive is sometimes problematical in a mass-produced item. Even with good initial quality, with repeated use and washing over time, the integrity of the seal may be degraded, leading to leakage of liquid into the space between the walls. With the inner and outer receptacles being more or less permanently joined, separating the two receptacles to clean the space is not a practical option. Consequently, the leakage of liquid into the inter-wall space typically requires the disposal of the vessel.

The need has therefore been felt for a dual wall vessel or tumbler that overcomes the above-noted shortcomings of the prior art. More specifically, there has been an as yet unmet need for a dual wall tumbler or the like that provides effective sealing between the walls, and that also allows at least a partial disassembly if the need arises to remove liquid that leaks into the inter-wall space.

SUMMARY

Broadly, in one aspect, the present disclosure relates to a drinking vessel, comprising a first receptacle having a first (outer) circumferential side wall extending from a closed bottom end to a circumferential shoulder having a peripheral edge defining a first diameter, and an externally-threaded attachment portion upwardly extending from the shoulder to a peripheral lip, the attachment portion having a second diameter that is smaller than the first diameter. A second receptacle is configured to fit inside the first receptacle and has a closed bottom end, a second (inner) circumferential side wall extending from the bottom end to a peripheral upper rim defining an open top end, and a circumferential flange depending downwardly from the rim so as to fit coaxially around the externally-threaded attachment portion and having a lower end separated from the shoulder by a circumferential gap. The flange has an outer surface and an internally-threaded inner surface configured to mate with the externally-threaded attachment portion of the first (outer) receptacle. A resilient element has a grip portion covering the outer surface of the flange and a sealing portion configured to seal the gap.

In use, the resilient element provides an effective an effective, substantially fluid-tight seal between the flange of the second (inner) receptacle and the peripheral shoulder of the first (outer) receptacle, while also providing a non-slip gripping surface around the exterior of the flange. The inner and outer circumferential side walls define an inter-wall space that may be cleaned or drained by unthreading the externally-threaded attachment portion of the outer receptacle from the internally-threaded inner surface of the flange of the inner receptacle to separate the inner and outer receptacles. After the desire cleaning or draining is done, the two receptacles may be easily reattached by threading the flange onto the externally-threaded portion.

As will be better appreciated from the detailed description that follows, a dual wall vessel in accordance with the present disclosure provides good sealing of the inter-wall space, while also providing a simple and effective mechanism for removably attaching the two receptacles to each other to facilitate cleaning.

DETAILED DESCRIPTION

Figure 1:
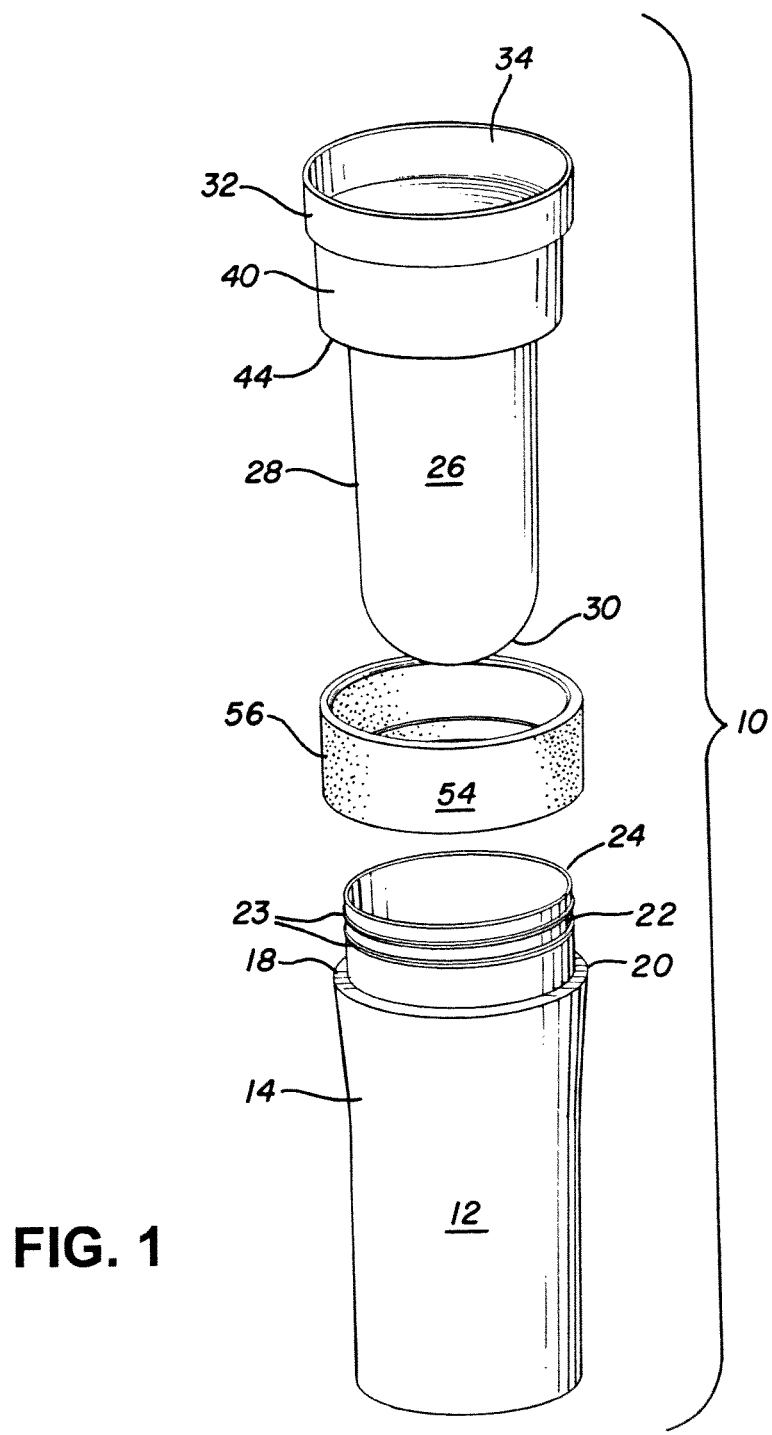
FIG. 1 is an exploded perspective view of a dual wall drinking vessel in accordance with an embodiment of the disclosure.

Turning to the drawings, a dual wall drinking vessel 10 is shown in accordance with an embodiment of this disclosure. The vessel 10 comprises a first or outer container or receptacle 12 includes a first or outer circumferential side wall 14 that extends from a closed bottom end 16 to a circumferential shoulder 18 having a peripheral edge 20 defining a first diameter. An attachment portion 22 with external threads 23 extends upwardly from the shoulder 18 and terminates in a peripheral lip 24. The attachment portion 22 has an outside diameter that is smaller than the first diameter defined by the peripheral edge 20 of the shoulder 18, thereby defining a sealing surface on the shoulder 18 circumscribing the attachment portion 22 near its juncture with the first circumferential side wall.

Figure 2:
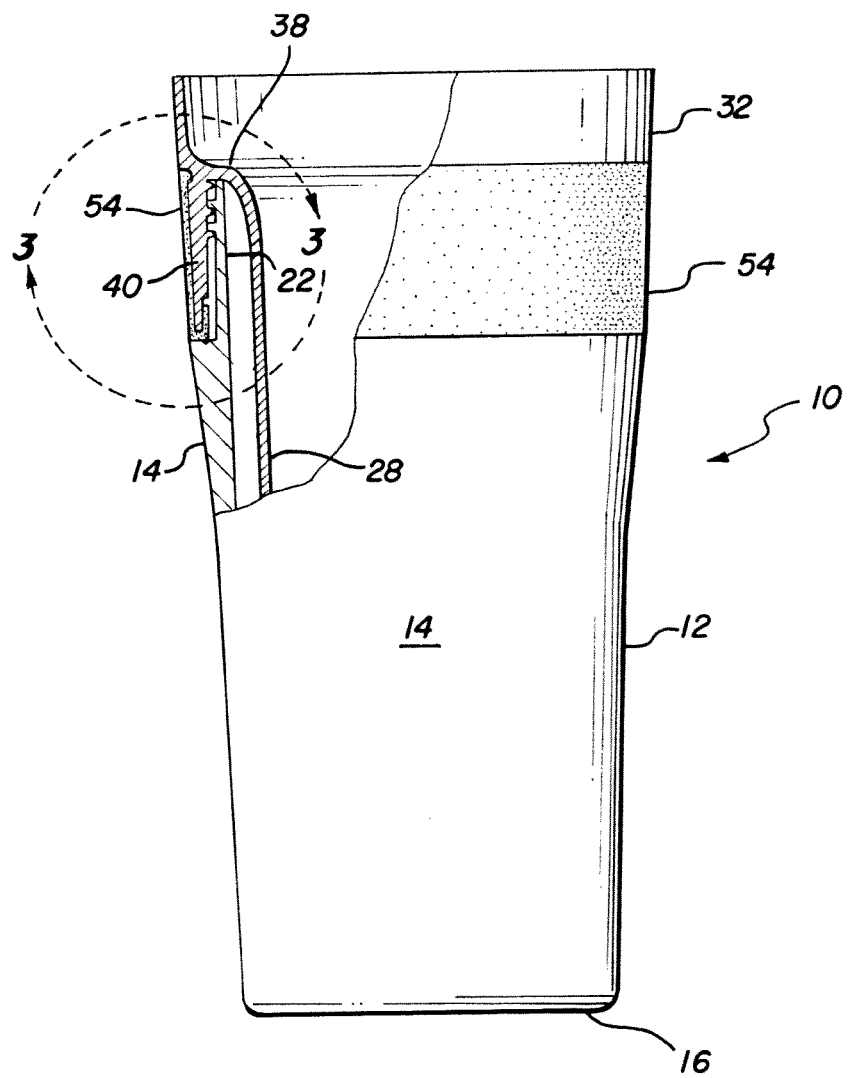
FIG. 2 is an elevation view, partially in cross-section, of the vessel of FIG. 1.
Figure 3:
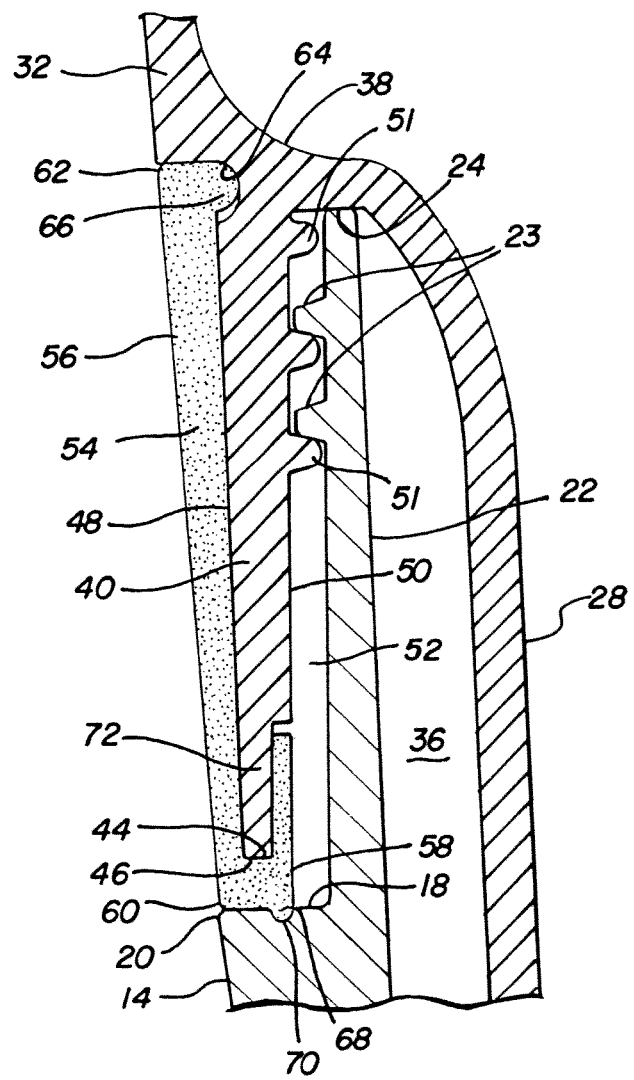
FIG. 3 is a detailed cross-sectional view taken within the broken outline 3-3 of FIG. 2.

A second or inner container or receptacle 26 is configured to fit inside the first or outer receptacle 12. The inner receptacle 26 has a second or inner circumferential side wall 28 extending from a closed bottom end 30 to a circumferential upper rim 32 defining an open top end 34. As shown in FIGS. 2 and 3, the inner side wall 28 has an outside diameter that is measurably smaller than the outside diameter of the outer side wall 14, thereby defining an insulating inter-wall space 36 between the two walls 14, 28. The inner side wall 28 may advantageously be joined to the upper rim 32 by a radially-outward extending transition portion 38, best shown in FIG. 2. The transition portion 38 is advantageously located and configured so as to have a lower surface that engages the peripheral lip 24 of the attachment portion 22.

A circumferential flange 40 depends downwardly from the upper rim 32, or, preferably, from the juncture between the rim 32 and the transition portion 38, as shown in FIGS. 2 and 3. The flange 40 is dimensioned and configured to fit coaxially around the externally-threaded attachment portion 22, and it has a lower peripheral edge 44 that is spaced from the shoulder 18 by a circumferential gap 46. The flange 40 has an outer surface 48 and an inner surface 50 with internal threads 51 that are configured to removably mate with the threads 23 of the externally-threaded attachment portion 22. Thus, the inner surface 50 of the flange 40 has an inside diameter that is sufficiently larger than the outside diameter of the attachment portion 22 so as to allow the threaded engagement therebetween, while also providing a circumferential space 52 between the flange 40 and the attachment portion 22 below the engaged threads and above the shoulder 18. In addition, the outer surface 48 of the flange 40 may advantageously be slightly smaller than the diameter of the peripheral edge 20 of the shoulder 18, as will be explained below.

A resilient member 54 (preferably made of an elastomeric silicone composition) is fixed to the flange 40. The resilient member 54 includes a grip portion 56 that seats flush against the outer surface 48 of the flange 40, and a sealing portion 58 fits into the circumferential gap 46. If the outer surface 48 of the flange 40 is slightly smaller in diameter than the diameter of the peripheral edge 20 of the shoulder 18 (as may be preferred in some embodiments), the grip portion 56 may be shaped so that it has a lower edge 60 that lies substantially flush with the peripheral edge 20 of the shoulder, and an upper edge 62 that lies substantially flush with the rim 32, as best shown in FIG. 3. The sealing portion 58 is dimensioned to fit snugly against the sealing surface provided by the shoulder 18, and against the lower peripheral edge 44 of the flange 40, so as to provide a seal therebetween that is sufficiently fluid tight to keep any appreciable amount of liquid from entering the space 52 between the flange 40 and the attachment portion 22. A further sealing function, which minimizes the leakage of liquid into the inter wall space 36, is provided by the threads 23, 51, and by the engagement between the peripheral lip 24 and the underside of the transition portion 38.

The flange 40 has a juncture with the rim 32 that advantageously includes an upper circumferential groove 64 that receives an upper peripheral bead 66 extending radially inward from the interior surface of the grip portion 56. The engagement between the upper peripheral bead 66 and the upper groove 64 secures the resilient member 54 to the flange 40. Advantageously, the resilient member 54 may also be secured to the shoulder 18 by the engagement between a lower peripheral bead 68, extending downward from the sealing portion 58, and second or lower circumferential groove 70, formed in the shoulder 18, in which the lower peripheral bead 68 is seated. The flange 40 may also include a circumferential inner surface defined by a reduced-thickness portion 72 contiguous with the lower peripheral edge of the flange 40. Where the reduced-thickness portion 72 is provided, the sealing portion 58 of the resilient member 54 advantageously extends onto the reduced thickness portion 68, as shown in FIG. 3. The grip portion 56 of the resilient element 54 provides a non-slip gripping surface, and it may also be decorated or colored to provide an ornamental effect.

While a preferred embodiment is disclosed herein, it will be appreciated that a number of equivalent variations and modifications may suggest themselves to those skilled in the pertinent arts. Such variations and modifications should be considered within the spirit and scope of this disclosure, as further defined by the claims that follow.

What is claimed is:

1. A drinking vessel, comprising:
a first receptacle having a first circumferential side wall extending from a closed bottom end to a circumferential shoulder having a peripheral edge defining a first diameter;
an externally-threaded attachment portion extending from the shoulder to a circumferential lip, the externally-threaded attachment portion having a second diameter that is smaller than the first diameter;
a second receptacle configured to fit inside the first receptacle and having a second circumferential side wall extending from a closed bottom end to a circumferential upper rim defining an open top end;
a circumferential flange depending downwardly from the circumferential upper rim so as to fit coaxially around the externally-threaded attachment portion and having a lower end separated from the shoulder by a circumferential gap, the circumferential flange having an outer surface and an internally-threaded portion configured to mate with the externally-threaded attachment portion; and
a resilient element having a grip portion on the outer surface of the circumferential flange and a sealing portion configured to seal the circumferential gap;
wherein the circumferential flange has a juncture with the circumferential upper rim that defines a circumferential groove, and wherein the grip portion of the resilient element includes a radially-inward extending peripheral bead that is received in the circumferential groove.

2. The drinking vessel of claim 1, wherein the outer surface of the flange defines a third diameter that is smaller than the first diameter and larger than the second diameter.

3. The drinking vessel of claim 1, wherein the second circumferential side wall is joined to the upper rim by a radially-outward extending transition portion, and wherein the flange extends downwardly from a juncture between the transition portion and the rim.

4. The drinking vessel of claim 3, wherein the transition portion defines a lower surface that engages the circumferential lip of the externally-threaded attachment portion of the first receptacle.

5. The drinking vessel of claim 1, wherein the grip portion of the resilient element defines a circumferential gripping surface that is substantially flush with the circumferential upper rim.

6. The drinking vessel of claim 1, wherein the circumferential flange includes a circumferential inner surface defined by a reduced thickness portion contiguous with the lower end, and wherein the sealing portion of the resilient element extends onto the circumferential inner surface of the circumferential flange.

7. A drinking vessel, comprising:
a first receptacle having a first circumferential side wall extending from a closed bottom end to a circumferential shoulder having a peripheral edge defining a first diameter;
an externally-threaded attachment portion extending from the shoulder to a circumferential lip, the externally-threaded attachment portion having a second diameter that is smaller than the first diameter;
a second receptacle configured to fit inside the first receptacle and having a second circumferential side wall extending from a closed bottom end to a circumferential upper rim defining an open top end;
a circumferential flange depending downwardly from the circumferential upper rim so as to fit coaxially around the externally-threaded attachment portion and having a lower end separated from the shoulder by a circumferential gap, the circumferential flange having an outer surface and an internally-threaded portion configured to mate with the externally-threaded attachment portion; and a resilient element having a grip portion on the outer surface of the circumferential flange and a sealing portion configured to seal the circumferential gap;

wherein the circumferential flange includes a circumferential inner surface defined by a reduced thickness portion contiguous with the lower end, and wherein the sealing portion of the resilient element extends onto the circumferential inner surface of the circumferential flange.

8. The drinking vessel of claim 7, wherein the outer surface of the circumferential flange defines a third diameter that is smaller than the first diameter and larger than the second diameter.

9. The drinking vessel of claim 7, wherein the second circumferential side wall is joined to the circumferential upper rim by a radially-outward extending transition portion, and wherein the circumferential flange extends downwardly from a juncture between the transition portion and the circumferential upper rim.

10. The drinking vessel of claim 9, wherein the transition portion defines a lower surface that engages the circumferential lip of the externally-threaded attachment portion of the first receptacle.

11. The drinking vessel of claim 7, wherein the grip portion of the resilient element defines a circumferential gripping surface that is substantially flush with the circumferential rim.

12. The drinking vessel of claim 7, wherein the circumferential flange has a juncture with the circumferential upper rim that defines a circumferential groove, and wherein the grip portion of the resilient element includes a radially-inward extending peripheral bead that is received in the circumferential groove.

* * * * *